(12) United States Patent
Lee

(10) Patent No.: US 7,015,999 B2
(45) Date of Patent: *Mar. 21, 2006

(54) METHOD OF FABRICATING AN ARRAY SUBSTRATE FOR IPS MODE LIQUID CRYSTAL DISPLAY DEVICE

(75) Inventor: Sang-Hyuk Lee, Ulsan (KR)

(73) Assignee: LG.Philips LCD Co., Ltd., Seoul (KR)

( * ) Notice: Subject to any disclaimer, the term of this patent is extended or adjusted under 35 U.S.C. 154(b) by 0 days.

This patent is subject to a terminal disclaimer.

(21) Appl. No.: 10/990,972

(22) Filed: Nov. 18, 2004

(65) Prior Publication Data

US 2005/0088393 A1 Apr. 28, 2005

Related U.S. Application Data

(63) Continuation of application No. 10/782,946, filed on Feb. 23, 2004, now Pat. No. 6,839,111.

(30) Foreign Application Priority Data

Dec. 28, 2001 (KR) ............................... 2001-87552

(51) Int. Cl.
G02F 1/1337 (2006.01)
G02F 1/136 (2006.01)
G02F 1/1343 (2006.01)

(52) U.S. Cl. ...................... 349/126; 349/46; 349/141

(58) Field of Classification Search ............... 349/141, 349/143, 126, 41–43, 46
See application file for complete search history.

(56) References Cited

U.S. PATENT DOCUMENTS

| 5,598,285 A | 1/1997 | Kondo et al. |
| 5,745,207 A | 4/1998 | Asada et al. |
| 5,838,037 A | 11/1998 | Masutani et al. |
| 5,946,060 A | 8/1999 | Nishiki et al. |
| 5,990,987 A | 11/1999 | Tanaka et al |
| 6,028,653 A | 2/2000 | Nishida et al. |
| 6,097,454 A | 8/2000 | Zhang et al. |
| 6,839,111 B1 * | 1/2005 | Lee ............................ 349/126 |

FOREIGN PATENT DOCUMENTS

| JP | 9005764 A2 | 1/1997 |
| JP | 9073101 A2 | 3/1997 |

(Continued)

OTHER PUBLICATIONS

R. Kiefer, et al., "In-Plane Switching of Nematic Liquid Crystals." Japan Display, 1992, pp 547-550.

(Continued)

*Primary Examiner*—Dung T. Nguyen
(74) *Attorney, Agent, or Firm*—McKenna Long & Aldridge LLP

(57) ABSTRACT

An array substrate for in-plane switching (IPS) mode liquid crystal display (LCD) device includes a gate line and a common line in a horizontal direction on a substrate, a data line crossing the gate line and the common line, a pixel electrode and a common electrode on the substrate, and a thin film transistor at a crossing point of the gate line and the data line, the thin film transistor having a gate electrode, an active layer and source and drain electrodes, the gate electrode having a slope that satisfies a numeral expression $|\theta_R - \theta_g| = 89° \sim 91°$ (degree) wherein $\theta_R$ is an angle of a rubbing direction measured from an arbitrary horizontal line and $\theta_g$ is an angle of the slope of the gate electrode measured from the arbitrary horizontal line.

17 Claims, 8 Drawing Sheets

FOREIGN PATENT DOCUMENTS

| | | | |
|---|---|---|---|
| JP | 9101538 | A2 | 4/1997 |
| JP | 9105908 | A2 | 4/1997 |

OTHER PUBLICATIONS

M. Oh-e, et al., "*Principles and Characteristics of Electro-Optical Behaviour with In-Plane Switching Mode.*" Asia Display, 1995, pp 577-580.

M. Ohta, et al., "*Development of Super-TFT-LCDs with In-Plane Switching Display Mode.*" Asia Display, 1995, pp 707-710.

S. Matsumoto, et al., "*Display Characteristic of In-Plane-Switching (IPS) LCDs and a Wide-Viewing-Angle 14.5-in. IPS TFT-LCD.*" Euro Display, 1996, pp 445-448.

H. Wakemoto, et al., "*An Advanced In-Plane-Switching Mode TFT-LCD.*" Science I. D. 1997, pp 929-932.

S. H. Lee, et al., "*High-Transmittance, Wide-Viewing-Angle Nematic Liquid Crystal Display controlled by Fringe-Field Switching.*" Asia display, 1998, pp 371-374.

S. Endoh, et al., "*Advanced 18.1-Inch Diagonal Super-TFT-LCDs with Mega Wide Viewing Angle and Fast Response speed of 20ms.*" IDW, 1999, pp 187.

* cited by examiner

METHOD OF FABRICATING AN ARRAY SUBSTRATE FOR IPS MODE LIQUID CRYSTAL DISPLAY DEVICE this application is a continuation of prior application Ser. No. 10/782,946, filed Feb. 23, 2004 now U.S. Pat. No. 6,839,111, now allowed; which claims priority to U.S. Pat. No. 6,738,110, filed Dec. 19, 2002 and Korean Patent Application No. 2001-87552, filed on Dec. 28, 2001, each of which are hereby incorporated by reference for all purposes as if fully set forth herein.

BACKGROUND OF THE INVENTION

1. Field of the Invention

The present invention relates to a liquid crystal display (LCD) device and more particularly, to an array substrate for In-Plane Switching (IPS) mode liquid crystal display device which displays superior images by preventing light leakage in an area adjacent to a thin film transistor region.

2. Discussion of the Related Art

A typical liquid crystal display (LCD) device uses optical anisotropy and polarization properties of liquid crystal molecules. The liquid crystal molecules have a definite orientation order in alignment resulting from their thin and long shapes. The alignment direction of the liquid crystal molecules can be controlled by supplying an electric field to the liquid crystal molecules. In other words, as the alignment direction of the electric field is changed, the alignment of the liquid crystal molecules also changes. Because incident light is refracted to the orientation of the liquid crystal molecules due to the optical anisotropy of the aligned liquid crystal molecules, image data is displayed.

Active matrix liquid crystal display (AMLCD) devices, in which the thin film transistors and the pixel electrodes are arranged in the form of a matrix, are widely used because of their high resolution and superiority in displaying moving images. An array substrate for the in-plane switching (IPS) mode liquid crystal display (LCD) device will be described hereinafter with reference to the following figures.

FIG. 1 is a plan view of a pixel of an array substrate for a related art in-plane switching (IPS) mode liquid crystal display (LCD) device. In FIG. 1, a plurality of gate lines 12 and common lines 16 are horizontally formed on an array substrate 10 and are spaced apart from each other. A plurality of data lines 24 is vertically formed on the array substrate 10 and cross the gate lines 12 and the common lines 16. The data line 24 defines a pixel region "P" by crossing the gate line 12. A thin film transistor "T" is formed at a crossing point of the gate line 12 and the data line 24. The thin film transistor "T" includes a gate electrode 14, an active layer 20, a source electrode 26 and a drain electrode 28. The gate electrode 14 communicates with the gate line 12 and the source electrode 26 communicates with the data line 24. The source electrode 26 has a U-shape surrounding the drain electrode 28 and the drain electrode 28 has an I-shape. A pixel electrode 30 that communicates with the drain electrode 28 and a common electrode 17 parallel with the pixel electrode 30 are formed in the pixel region "P". The common electrode 17 communicates with the common line 16. The pixel electrode 30 comprises an extension portion 30a, a vertical portion 30b and a horizontal portion 30c. The extension portion 30a of the pixel electrode 30 is extended from the drain electrode 28 and the vertical portion 30b of the pixel electrode 30 is vertically extended from the extension portion 30a. The horizontal portion 30c of the pixel electrode 30 is formed over the common line 16 and connects the vertical portions 30b into one portion. The common electrode 17 comprises a horizontal portion 17a and a plurality of vertical portions 17b. The plurality of the vertical portions 17b of the common electrode 17 is arranged in an alternating order with the vertical portions 30b of the pixel electrode 30. The horizontal portion 17a of the common electrode 17 connects the plurality of the vertical portions 17b into one portion. The vertical portions 17b of the common electrode 17 are spaced apart from the data line 24. A storage capacitor "C" is formed in the pixel region "P". The storage capacitor "C" uses a portion of the common line 16 as a first storage electrode and the horizontal portion 30c of the pixel electrode 30 as a second storage electrode.

A typical driving method of a pixel will be described hereinafter with reference to FIG. 2 which is a signal graph illustrating voltage signals of a gate electrode and a common electrode during a frame. The graph shows applying states of a gate voltage ($V_g$) and a common voltage ($V_{com}$) during a frame period. In FIG. 2, $V_{gh}$ and $V_{gl}$ show a high and a low state of the gate voltage $V_g$ and $V_{dh}$ respectively, and $V_{dl}$ show a high and a low state of the data voltage $V_d$. As shown in the figure, a voltage of about +18 volts is applied when the gate voltage ($V_g$) is in the on state and a voltage of about −5 volts is applied when the gate voltage ($V_g$) is off state. A high-level data voltage ($V_d$) is inputted when the gate voltage ($V_g$) is in the on state and maintained until a next gate voltage ($V_g$) reaches the on state. This voltage applying process fulfills a drive of liquid crystal in the pixel region. If the liquid crystal display (LCD) device is normally black mode, a black color is displayed when the voltage is not applied. However, a light leakage phenomenon occurs in region "A" of FIG. 1 when the gate voltage ($V_g$) is in the off state.

FIG. 3 is a plan view illustrating an electric field direction between the gate electrode and the common electrode when the gate voltage ($V_g$) is in the off state according to the related art. FIG. 4 is a plan view illustrating an alignment direction of liquid crystal molecules between the gate electrode and the common electrode when the gate voltage ($V_g$) is in the off state according to the related art.

In FIG. 3, region "B" shows an electric field distribution in a region "E" between the gate electrode 14 and the common electrode 17. In FIG. 4, region "F" is a long axis direction of the liquid crystal 19 and region "D" is a rubbing direction of a substrate. As shown in FIG. 4, the liquid crystal 19 is aligned parallel with the rubbing direction when the voltage is not applied. However, an electric potential difference actual exists in the region "A" between the gate electrode 14 and the common electrode 17. Subsequently, the electric field distribution occurs, which has a certain direction, between the gate electrode 14 and the common electrode 17. As shown in FIG. 3 and FIG. 4, the electric field direction is perpendicular to the long axes "F" of the liquid crystal 19 in the region between the gate electrode 14 and the common electrode 17. The liquid crystal 19 will subsequently align according to the electric field direction when the gate voltage ($V_g$) is in the off state. Accordingly, light irradiated from a backlight passes through the "A" region and thus the light leakage phenomenon occurs when the gate voltage ($V_g$) is not applied at the normally black mode. Though a black matrix is generally formed on an upper substrate (not shown) in order to intercept the light leakage in the region "A", it still may be difficult to display a high quality image if an aligning error of the upper and lower substrate occurs.

SUMMARY OF THE INVENTION

Accordingly, the present invention is directed to an array substrate for in-plane switching (IPS) mode liquid crystal display (LCD) device that substantially obviates one or more of problems due to limitations and disadvantages of the related art.

An advantage of the present invention is to provide the array substrate for in-plane switching (IPS) mode liquid crystal display (LCD) device in order to display a high quality image by preventing light leakage in a region between a gate electrode and a common electrode.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an array substrate for in-plane switching (IPS) mode liquid crystal display (LCD) device comprises a gate line and a common line in a horizontal direction on a substrate; a data line crossing the gate line and the common line; a pixel electrode and a common electrode; and a thin film transistor at a crossing point of the gate line and the data line, the thin film transistor having a gate electrode, an active layer and source and drain electrodes, the gate electrode having a slope that satisfies a numeral expression $|\theta_R - \theta_g| = 89° \sim 91°$ (degrees), wherein $\theta_R$ is an angle of a rubbing direction measured from an arbitrary horizontal line and $\theta_g$ is an angle of the slope of the gate electrode measured from the arbitrary horizontal line. The common electrode and the pixel electrode are formed in a zigzag pattern. The source and drain electrodes are formed over a portion of the gate line. The source electrode has an U-shape and the drain electrode is formed in an interior of the U-shape.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE ILLUSTRATED EMBODIMENTS

Reference will now be made in detail to embodiments of the present invention, example of which is illustrated in the accompanying drawings.

Figure 1:
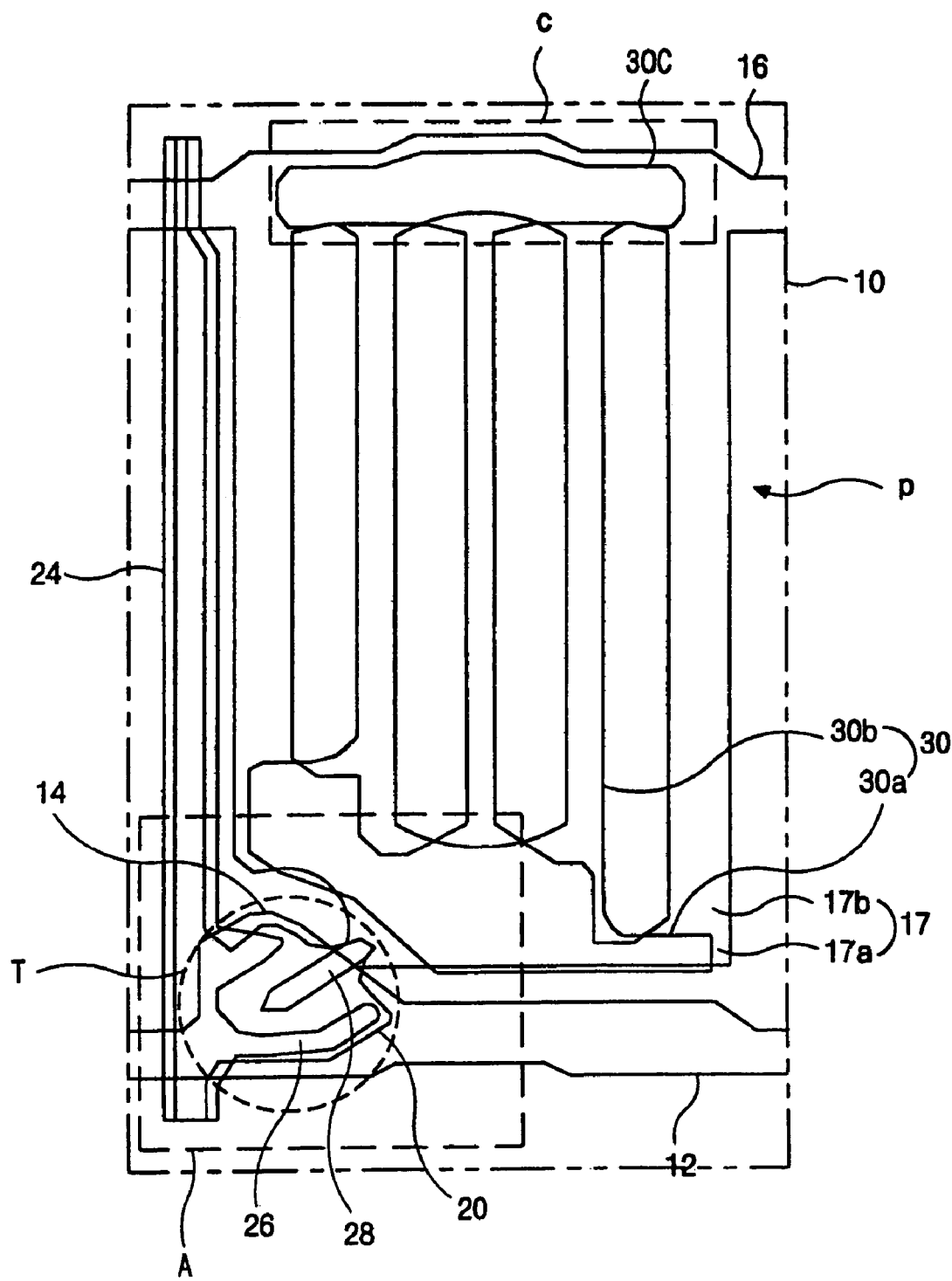
FIG. 1 is a plan view of a pixel of an array substrate for a related art in-plane switching (IPS) mode liquid crystal display (LCD) device.
Figure 2:
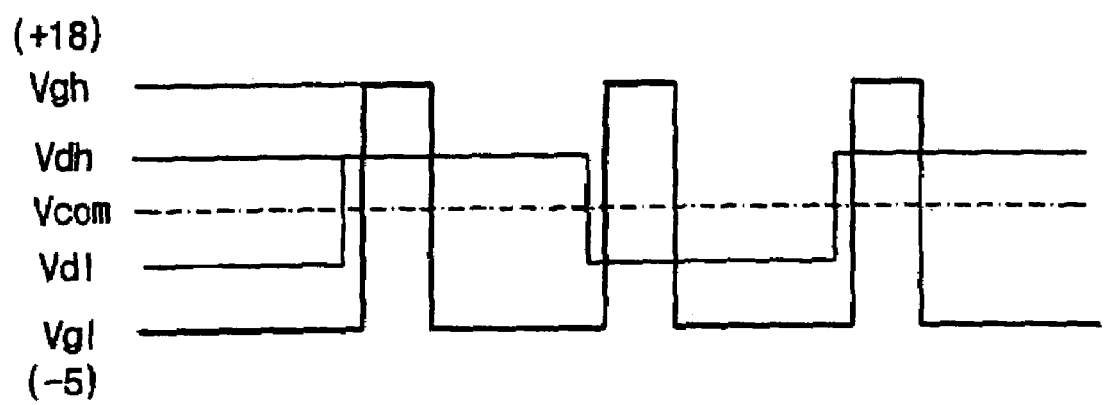
FIG. 2 is a signal graph illustrating voltage signals of a gate electrode and a common electrode during a frame.
Figure 3:
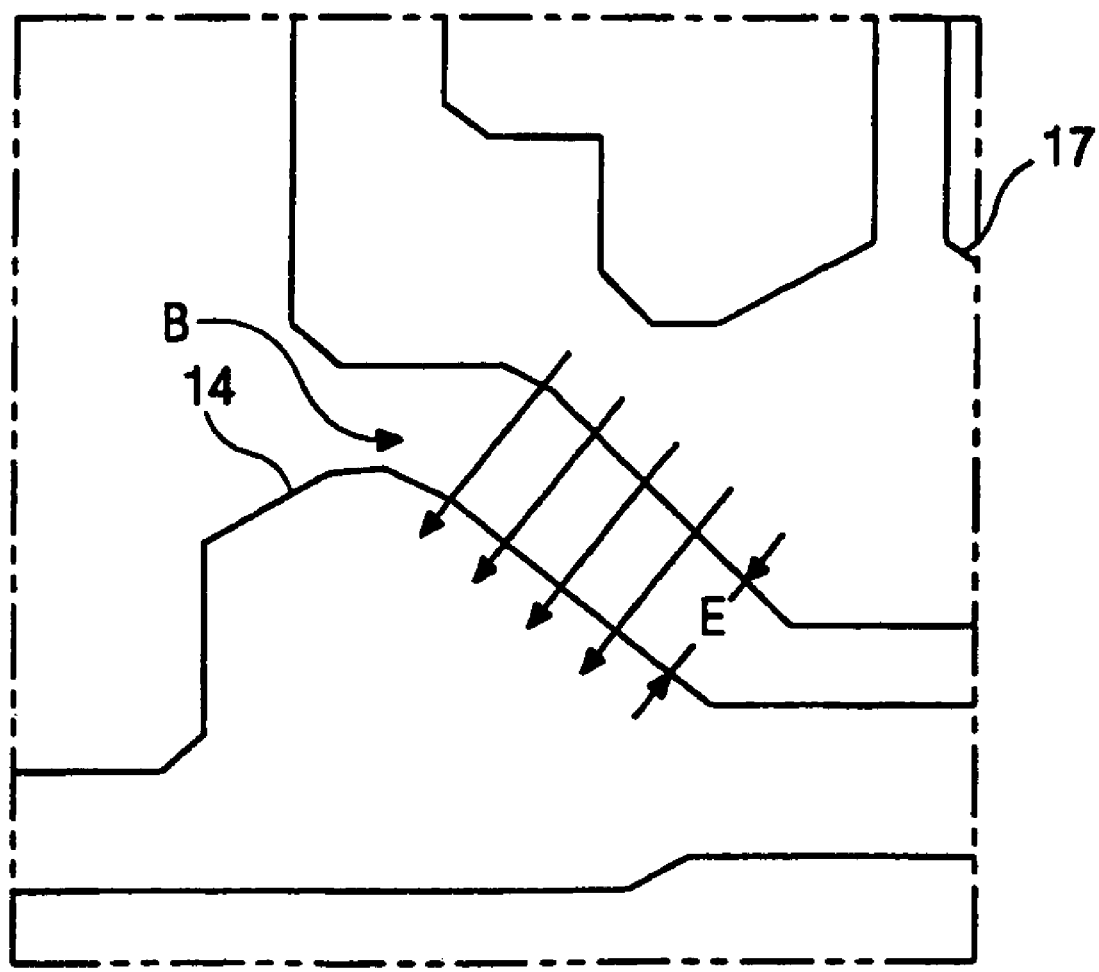
FIG. 3 is a plan view illustrating an electric field direction between the gate electrode and the common electrode when a gate voltage ($V_g$) is in the off state according to the related art.
Figure 4:
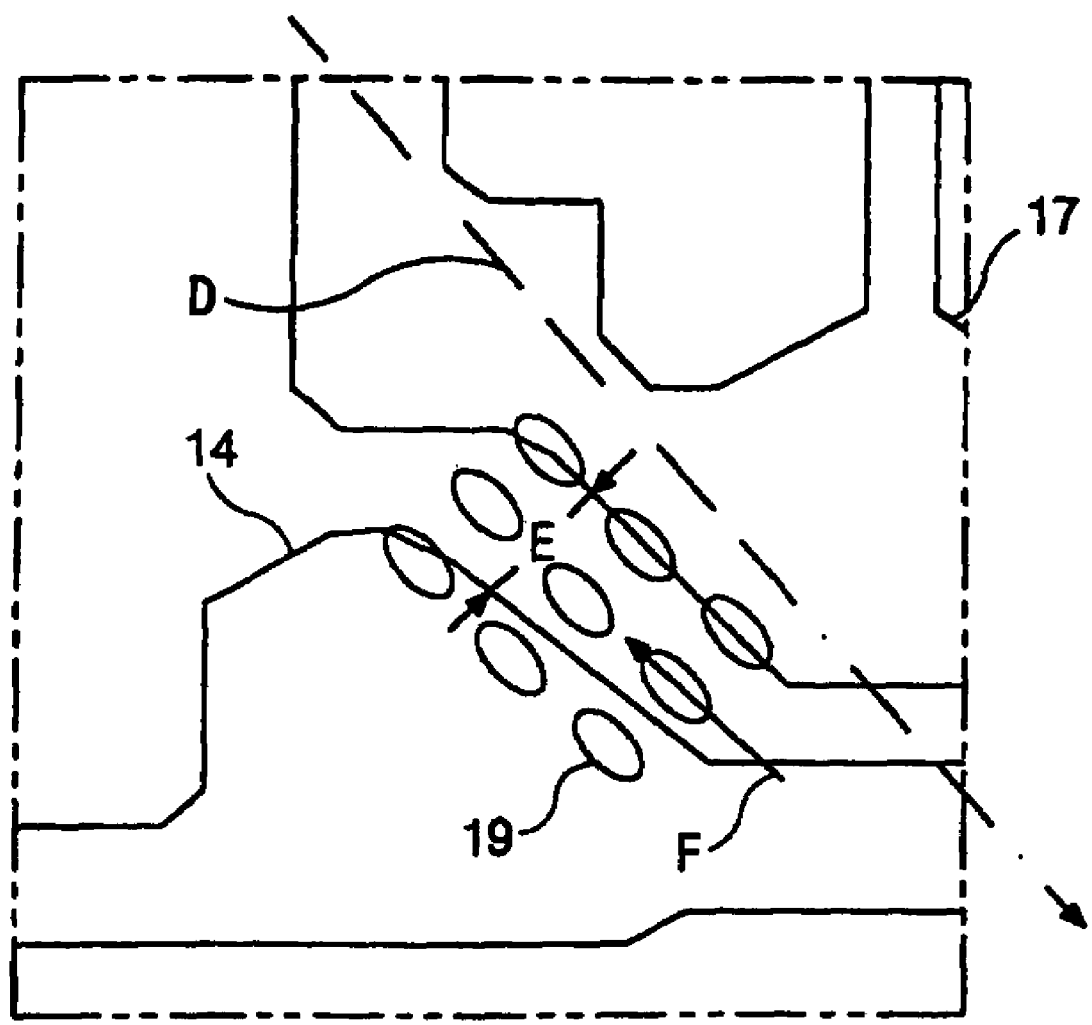
FIG. 4 is a plan view illustrating an alignment direction of liquid crystal molecules between the gate electrode and the common electrode when a gate voltage ($V_g$) is in the off state according to the related art.
Figure 5:
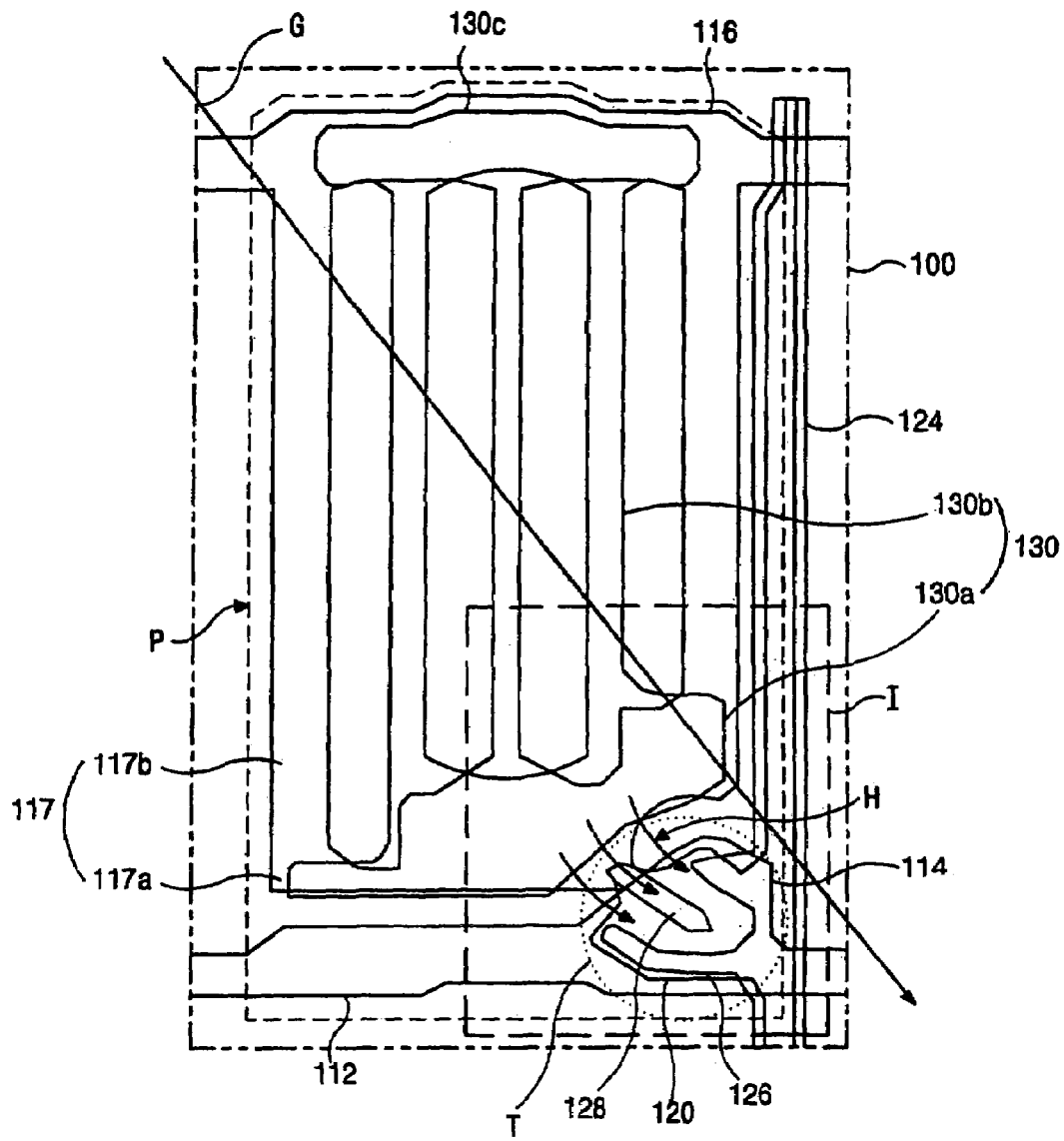
FIG. 5 is a plan view of a pixel of an array substrate for an in-plane switching (IPS) mode liquid crystal display (LCD) device according to a first embodiment of the present invention.

FIG. 5 is a plan view of a pixel of an array substrate for an in-plane switching (IPS) mode liquid crystal display (LCD) device according to a first embodiment of the present invention. In FIG. 5, a plurality of gate lines 112, common lines 116 and data lines 124 are formed on an array substrate 100 for in-plane switching (IPS) mode liquid crystal display (LCD) device. The gate line 112 and the common line 116 are formed in a horizontal direction and spaced apart from each other. The data line 124 crosses the gate line 112 and the common line 116 and defines a pixel region "P" by crossing the gate line 112. A thin film transistor "T" is formed at a crossing point of the gate and data lines. The thin film transistor "T" has a gate electrode 114, an active layer 120 and source and drain electrodes 126 and 128. The gate electrode 114 communicates with the gate line 112 and the source electrode 126 communicates with the data line 124. The source electrode has an U-shape surrounding the drain electrode 128 and the drain electrode 128 has an I-shape. These shape of the source and drain electrodes 126 and 128 help to improve a mobility of an electron by shortening a channel length and widening a channel width between the source and drain electrodes 126 and 128. The gate electrode 114 has a slope of over about ninety degrees. A pixel electrode 130 and a common electrode 117 are formed in the pixel region "P". The pixel electrode 130 communicates with the drain electrode 128. The common electrode 117 communicates with the common line 116. The pixel electrode 130 has an extension portion 130a, a plurality of vertical portions 130b and a horizontal portion 130c. The extension portion 130a is extended from the drain electrode 128. The vertical portions 130b are vertically extended from the extended portion 130a and spaced apart from each other. The horizontal portion 130c is disposed over the common line 116 and connects the plurality of vertical portions 130b into one portion. The common electrode 117 has a plurality of vertical portions 117b and a horizontal portion 117a. The vertical portions 117b are vertically extended from the common line 116 and arranged in an alternating pattern with the vertical portions 130b of the pixel electrode 130. The horizontal portion 117a connects the vertical portions 117b into one portion. The horizontal portion 117a of the common electrode 117 has a side that is parallel with the slope of the gate electrode 114. The slope of the gate electrode 114 is perpendicular to a rubbing direction "G". Under this structure of the common electrode and the gate electrode, an electric field direction "H" and the rubbing direction "G"

become parallel to each other between the common electrode 117 and the gate electrode 114 when a gate voltage is in the off state.

Figure 6:
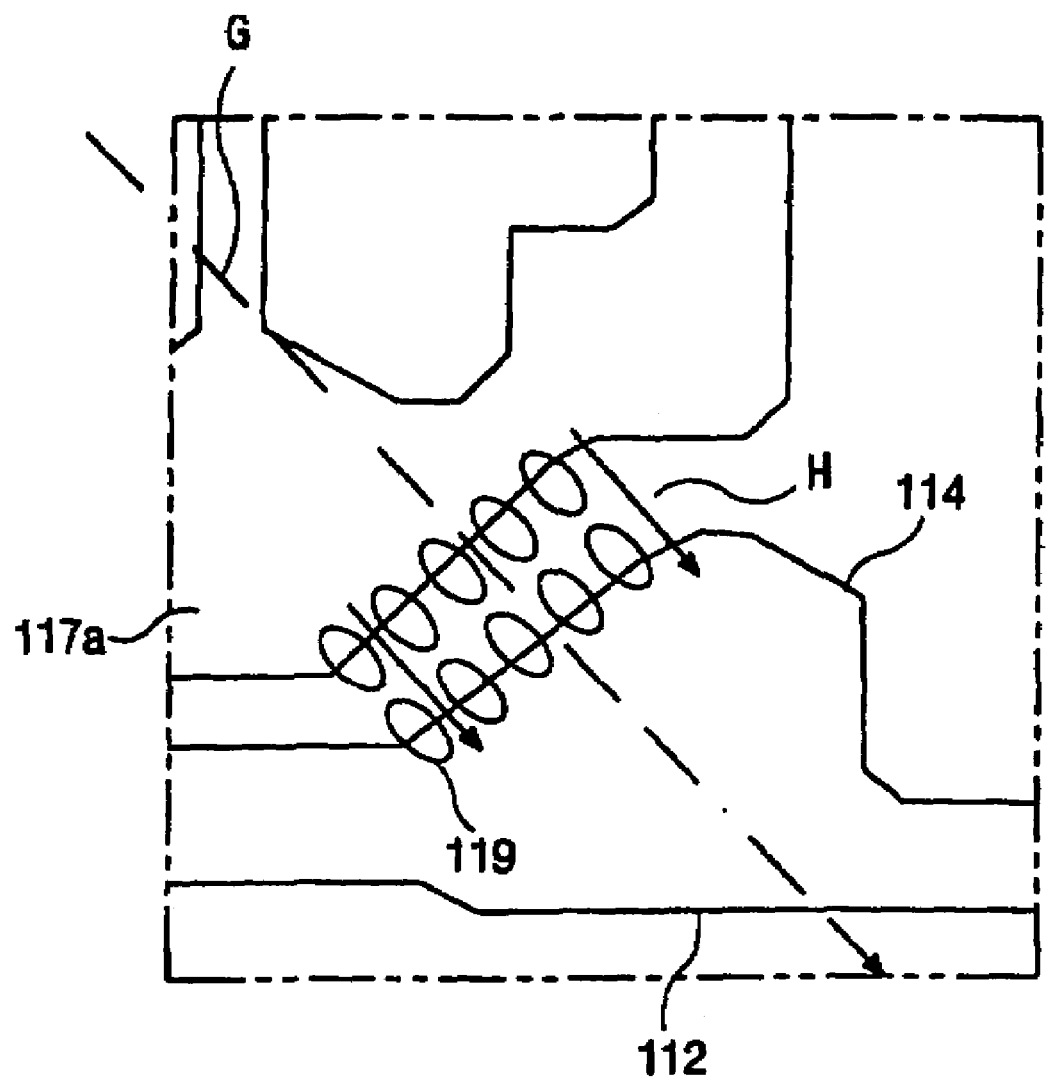
FIG. 6 is a plan view illustrating an electric field direction between a gate electrode and a common electrode according to the first embodiment of the present invention.

FIG. 6 is a plan view illustrating an electric field direction between a gate electrode and a common electrode according to the first embodiment of the present invention. In FIG. 6, only the gate line 112, the gate electrode 114 and the common electrode 117 are illustrated. As shown in the figure, because an alignment direction of liquid crystal 119 is parallel with the electric field direction "H" between the common electrode 117 and the gate electrode 114, there is no change in alignment direction of the liquid crystal 119 from an initial alignment state. Accordingly, there is no change in a polarization of light that passes through a region between the common electrode 117 and the gate electrode 114 so that clearer black mode can be displayed. That is, because an electric potential difference does not occur between the common electrode 117 and the gate electrode 114, a light leakage phenomenon does not occur.

Figure 7:
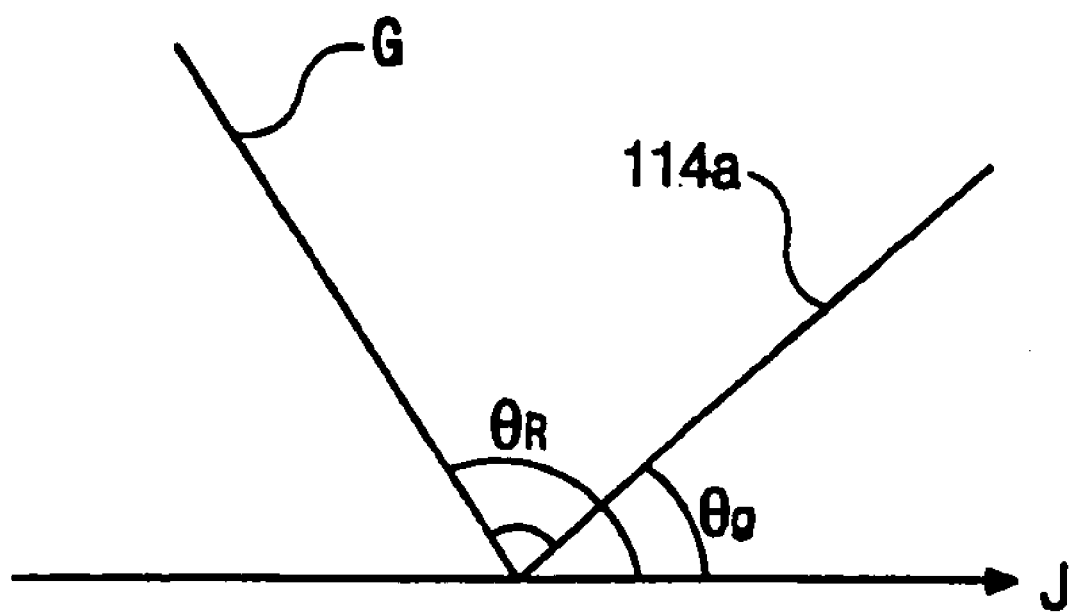
FIG. 7 is a graph illustrating angles of a rubbing direction and a slope of the gate electrode measured from a horizontal line.

The common electrode 117 and the gate electrode 114 can be designed as follows. In FIG. 7, $\theta_R$ is an angle measured from a horizontal line "J" to the rubbing direction "G" and $\theta_g$ is an angle measured from the horizontal line "J" to the slope 114a of the gate electrode 114. The common electrode 117 and the gate electrode 114 can be designed using a formula as follows:

$$|\theta_R - \theta_g| = 89° \sim 91° \text{(degrees)}$$

An array substrate for in-plane switching (IPS) mode liquid crystal display (LCD) device according to a second embodiment of the present invention, which is designed using the above formula, will be explained hereinafter with reference to FIG. 8.

Figure 8:
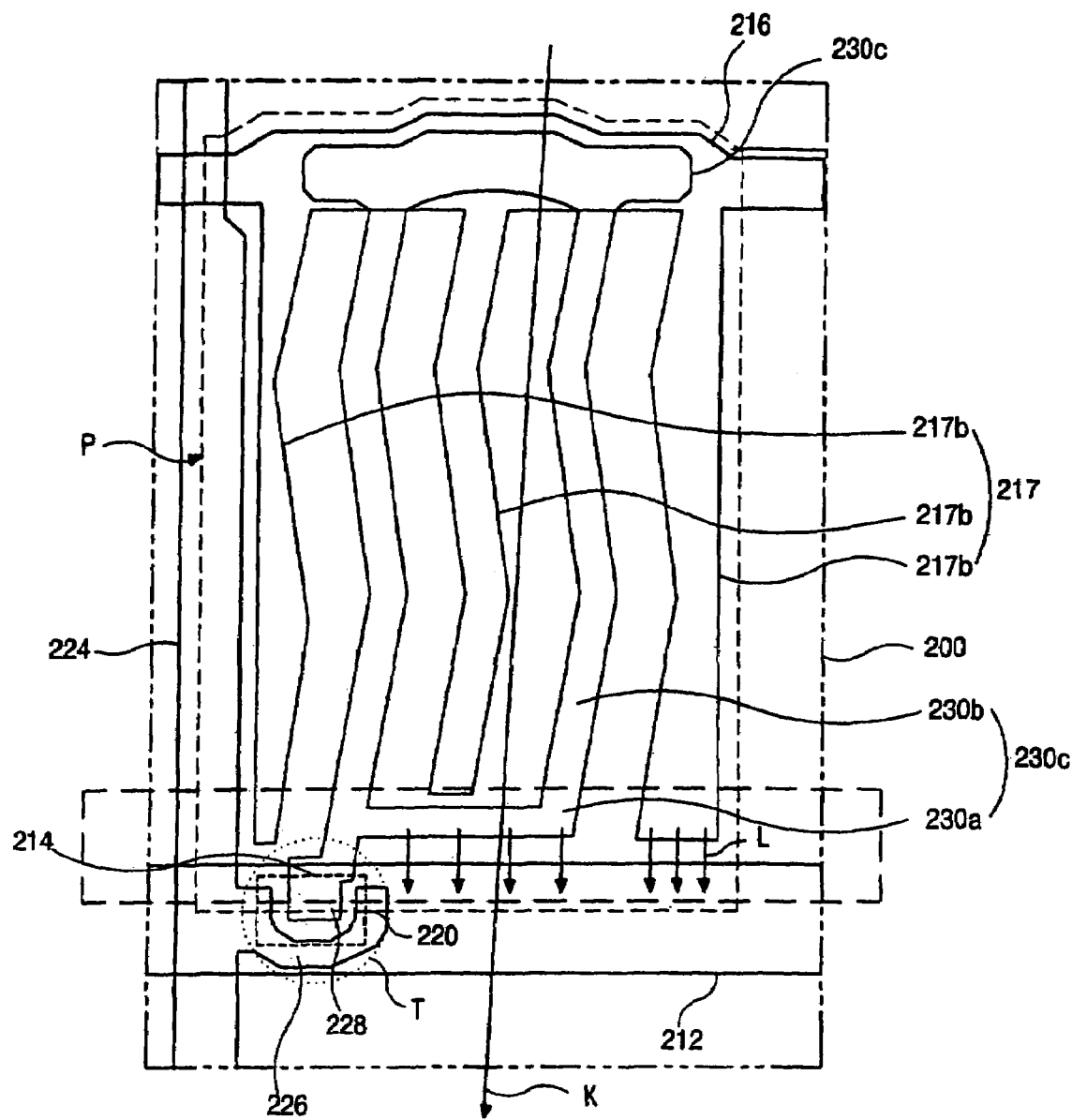
FIG. 8 is a plan view of a pixel of an array substrate for an in-plane switching (IPS) mode liquid crystal display (LCD) device according to a second embodiment of the present invention.

FIG. 8 is a plan view of a pixel of an array substrate for an in-plane switching (IPS) mode liquid crystal display (LCD) device according to the second embodiment of the present invention. As shown in FIG. 8, a plurality of gate lines 212, common lines 216 and data lines 224 are formed on an array substrate 200. The gate lines 212 and the common lines 216 are formed in a horizontal direction and spaced apart from each other. The data line 224 crosses the gate line 212 and the common line 216 and defines a pixel region "P" by crossing the gate line 212. A thin film transistor "T" is formed at a crossing point of the gate and data lines 212 and 224. The thin film transistor "T" has a gate electrode 214, an active layer 220 and source and drain electrodes 226 and 228. The gate electrode 214 communicates with the gate line 212 and the source electrode 226 communicates with the data line 224. The source electrode 226 has an U-shape surrounding the drain electrode 228. The drain electrode 228 has an I-shape. As a result of this structure of the source and drain electrodes 226 and 228, a channel length can be shortened and a channel width can be widened between the source electrode 226 and the drain electrode 228, and thus a mobility of an electron can be improved. A pixel electrode 230 and a common electrode 217 are formed in the pixel region "P". The pixel electrode 230 communicates with the drain electrode 228 and the common electrode 217 communicates with the common line 216. The common electrode 217 is formed parallel to the pixel electrode 230. The pixel electrode 230 has an extension portion 230a, a plurality of vertical portions 230b and a horizontal portion 230c. The extension portion 230a is extended from the drain electrode 228. The vertical portions 230b are vertically extended from the common line 216. The horizontal portion 230c is disposed over the common line 216 and connects the vertical portions 230b into one portion.

The common electrode 217 has a plurality of vertical portions 217b that is formed in an alternating pattern with the vertical portions 230b of the pixel electrode 230. A rubbing direction "K" is perpendicular to the gate electrode 214. In this structure, when a gate voltage is in the off state, an electric field direction "L" and an alignment direction of liquid crystal between the gate electrode 214 and the common and pixel electrodes 217b and 230b is parallel with the rubbing direction "K". Accordingly, a black mode can be displayed clearly because there is no change in the alignment direction of the liquid crystal from an initial state.

Though the embodiments illustrated here are for normally black mode, these embodiments may be applied to normally white mode. That is, a white color can be displayed clearly by forming the electric field direction and the alignment direction of liquid crystal between the gate electrode and the common electrode when the gate voltage is in the off state.

The present invention newly designs a gate electrode and a common electrode in order to make an initial alignment direction of liquid crystal parallel with an electric field direction between the gate electrode and the common electrode.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A method of fabricating an array substrate for in-plane switching mode liquid crystal display device, comprising:
   forming a gate line and a common line on a substrate;
   forming a data line crossing the gate line and the common line;
   forming a pixel electrode and a common electrode on the substrate;
   forming a thin film transistor at a cross point of the gate line and the data line, the thin film transistor having a gate electrode, an active layer, a source electrode and a drain electrode; and
   rubbing the substrate along a rubbing direction,
   wherein the rubbing direction is parallel with an electric field direction between the gate electrode and the common electrode.

2. The method according to claim 1, further comprising forming an alignment layer on the thin film transistor before the rubbing the substrate.

3. The method according to claim 1, wherein the common electrode and the pixel electrode are formed in a zigzag pattern.

4. The method according to claim 1, wherein the source and drain electrodes are formed over a portion of the gate line.

5. The method according to claim 1, wherein the source electrode has an U-shape and the drain electrode is formed in an interior of the U-shape.

6. The method according to claim 1, wherein the drain electrode has an I-shape.

7. The method according to claim 1, wherein the rubbing direction is substantially perpendicular to the gate electrode.

8. The method according to claim 1, wherein the pixel electrode has an extension portion, a plurality of vertical portions, and a horizontal portion.

9. The method according to claim 8, wherein the extension portion of the pixel electrode is extended from the drain electrode.

10. The method according to claim 8, wherein the vertical portions of the pixel electrode are vertically extended from the extended portion of the pixel electrode and are spaced apart from each other.

11. The method according to claim 8, wherein the horizontal portion of the pixel electrode is disposed over the common line and connects the vertical portions of the pixel electrode into one portion.

12. The method according to claim 1, wherein the common electrode has a plurality of vertical portions and a horizontal portion.

13. The method according to claim 12, wherein the vertical portions of the common electrode are vertically extended from the common line and arranged in an alternative pattern with the vertical portions of the pixel electrode.

14. The method according to claim 12, wherein the horizontal portion of the common electrode connects the vertical portions the common electrode into one portion.

15. The method according to claim 12, wherein the horizontal portion of the common electrode has a side that is parallel with a slope of the gate electrode.

16. The method according to claim 1, wherein the gate electrode has a slope that satisfies a numeral expression $|\theta_R-\theta_g|=89°\sim91°$ (degrees), wherein $\theta_R$ is an angle of the rubbing direction and $\theta_g$ is an angle of the slope of the gate electrode.

17. The method according to claim 16, wherein the slope of the gate electrode is substantially perpendicular to the rubbing direction.

* * * * *